TELEVISION CIRCUIT
Filed April 21, 1948
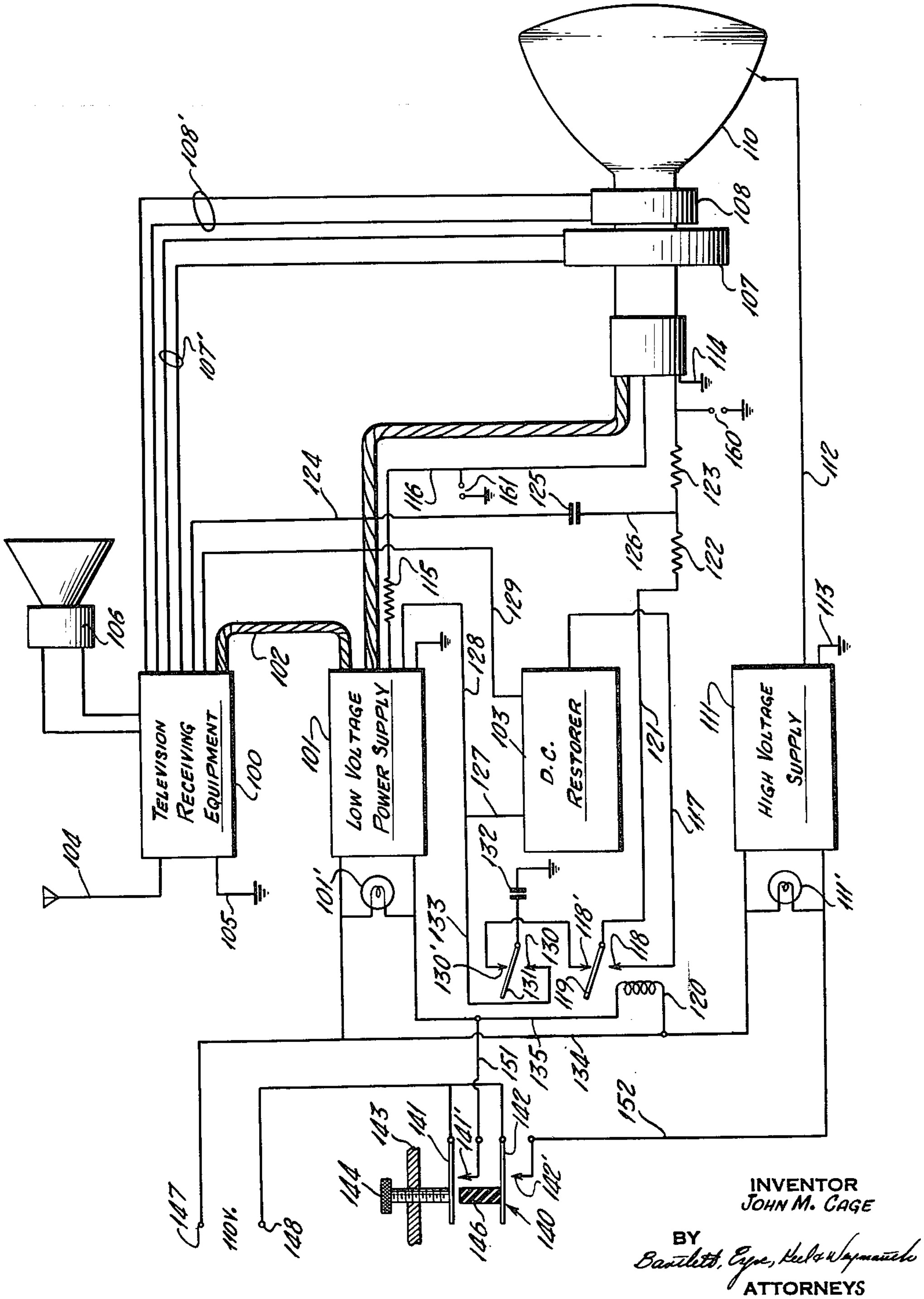
INVENTOR
JOHN M. CAGE
BY
Bartlett, Eyre, Keel & Waymanuchs
ATTORNEYS Patented Apr. 14, 1953 2,635,208

UNITED STATES PATENT OFFICE 2,635,208

TELEVISION CIRCUIT

John M. Cage, Montclair, N. J.

Application April 21, 1948, Serial No. 22,467

6 Claims. (Cl. 315—20)

This invention relates to electrical circuits for image reproducing tubes of the type used in television and other similar equipment.

Conventional electron beam tubes for the reproduction of images include means for generating and focusing an electron beam on a screen located at one end of the tube and means for accelerating the beam with a relatively high voltage so that the electrons will strike the screen with sufficient velocity to produce a point of light. The beam may be deflected either magnetically or electrostatically by suitable varying voltages and can be caused to scan or describe any desired path over the surface of the screen. By varying the intensity of the beam during this scanning operation in accordance with a suitable signal voltage a visible image can be formed on the screen.

One object of the invention is to provide a new and improved circuit for electronic image reproducing apparatus to obtain improved operation and performance.

Another object of the invention is to provide electric circuits for television and other similar equipment that will prevent possible damage to either the tube or the associated circuits in the event of sudden or momentary interruption of voltage to the television equipment.

Another object of the invention is to provide means for limiting the intensity of the electron beam in television apparatus in the event of a sudden interruption of electrical energy.

Still another object of the invention is an electric circuit that will insure the application of power to the scanning and control circuits prior to energizing the high voltage power supply to provide the accelerating potential.

It is a further object of this invention to provide a novel and improved circuit whereby cathode ray tubes using high accelerating voltages are safeguarded against a sudden interruption of bias, scanning and other voltages for the tube.

Still another object is a novel and improved circuit for protecting television apparatus and the associated image reproducing tube to obtain more dependable and improved operation.

The above and other objects will become more apparent in the following description and accompanying drawing which illustrates one embodiment of the invention.

I have found that the use of high accelerating voltages on cathode ray tubes and particularly projection tubes of the type heretofore described can easily result in damage either to the tube or to the associated circuits if the equipment is improperly operated or if certain circuits supplying energy to the tube should be momentarily interrupted, or if the tube itself should arc over. I have also found that even momentary interruption of the scanning and the beam current control circuits under certain conditions may result in permanent and serious damage to the tube screen.

I have been able to overcome these and other difficulties with the new and improved circuits for image reproducing equipment with the result that more dependable, stable and improved operation is obtained. For the purposes of the present application, these circuits are shown in the drawing as applied to a television receiver using a projection type image reproducing tube, although it is apparent that these circuits would also be useful for other similar electronic applications.

In the drawing, certain of the elements have been indicated in block form and of themselves do not form part of the invention. The television receiving equipment 100 and the low voltage power supply 101 have been illustrated as individual units connected by a multiple wire cable 102 for supplying the desired voltages to the receiver. In ordinary practice, however, these two units together with the D. C. restorer 103 are usually combined on a single chassis.

The television receiver 100 operates in the usual manner receiving energy from an antenna 104 and ground 105 and supplies audio energy to the loud speaker 106 for the reproduction of sound and focusing and scanning voltages to the focusing and scanning coils 107 and 108 disposed about the neck or cylindrical part of the projection tube 110 and connected to the receiver by the leads 107′ and 108′.

The second or accelerating anode voltage for the tube 110 is provided by a separate electronic high voltage power supply 111 having one or more vacuum tubes and connected to the tube 110 by the lead 112 and the ground connections 113 and 114. The cathode voltage for the tube 110 is provided by the low voltage power supply 101 through the lead 116 and the resistor 115.

The control grid voltage for controlling the beam current within the tube is provided by the D. C. restorer 103 through the lead 117, relay contacts 118 and 119, associated with the relay coil 120, the lead 121 and resistors 122 and 123. The video signal from the television receiving equipment 100 is connected to the tube by the lead 124, the condenser 125 and the lead 126 connected to the junction point of the resistors 122 and 123. This video signal voltage modifies the voltage from the D. C. restorer and modulates the beam current to brighten and darken the spot produced on the screen as the beam is deflected to scan the screen. The D. C. restorer 103 is also connected with the low voltage power supply 101 by the leads 127 and 128 and with the television receiving equipment by the lead 129 in the conventional manner so as to provide the desired grid voltage for the projection tube 110 in the manner heretofore described.

During the normal operation of a television receiver, should there be an interruption and the beam controlling and scanning voltages substantially reduced to zero, the beam current produced by the high beam accelerating voltage may reach an abnormally high value. In the absence of the scanning voltages, the electron beam is concentrated on a single spot on the screen and the high beam current will actually burn the screen and destroy its light producing properties at that point, if not result in more serious damage.

I have been able to safeguard the image reproducing tube and associated circuits in these instances by the provision of novel and improved means for maintaining the bias on the tube when the normal bias is interrupted and I can maintain that bias for a sufficiently long period of time to adequately safeguard the tube. For this purpose I employ means responsive to the bias voltage applied to the image reproducing tube to automatically connect an auxiliary or other voltage source to the image reproducing tube when the normal bias voltage is for one reason or another interrupted to prevent the beam current from reaching a value above that for normal and safe operation of the tube.

In the illustrated embodiment I provide a relay 120 and a capacitor 132 interconnected with the leads 117, 121 and 133 which comprise a part of the biasing or beam current controlling circuit for the tube 110.

More particularly the condenser 132, which is preferably of the order of 5 to 10 microfarads is connected between the contact arm 131 of the relay and ground. The contact 118' associated with the contact arm 119 is connected with the contact 130' associated with the contact arm 131 while the contact 130 is connected by the lead 133 to the biasing voltage provided by the low voltage power supply 101 by means of the lead 128. When the coil of the relay 120 is energized by the application of power to the power supply 101, the arm 131 makes contact with the contact 130 to apply this negative bias to the condenser 132 and the contact arm 119 makes contact with the contact 118 to complete the circuit between the leads 117 and 121 so that the D. C. restorer 103 can apply biasing or controlling voltage directly to the tube.

The coil of relay 120 being connected in parallel with the low voltage power supply 101 by the leads 134 and 135, will be deenergized in the event of any interruption of the supply of power to the low voltage power supply. With the relay in the deenergized position, grid voltage will be supplied to the tube 110 by the condenser 132 via the contact arm 131, interconnected contacts 130' and 118', contact arm 119, the lead 121 and resistors 122 and 123. Since both the high and low voltage power supplies 111 and 101 are customarily supplied from the same source, the interruption of voltage to one of them will consequently cause an interruption of voltage to the other. Therefore if condenser 132 is made sufficiently large it will maintain a substantial grid bias on the tube 110 until the high voltage from the power supply 111 falls to a value that will not damage the tube.

To further safeguard and obtain improved operation from projection tubes it is also desirable to ensure the application of power to the low voltage supply and the establishment of the controlling and scanning voltages before the high voltage supply is energized, and to deenergize the high voltage supply before the low voltage supply to avoid damaging beam currents. I have provided for this purpose a switch 140 having a pair of contact arms 141 and 142 and a pair of cooperating contacts 141' and 142'. The contact arms are actuated by a screw 143 having a knurled head part 144 threaded into the switch housing part 145 shown here in fragmentary section. Between the contact arms 141 and 142 is positioned an insulating member 146 so that the contact arm 141 must be moved through a given distance and contact its associated contact 141' before the arm 142 is moved to make contact with its associated contact 142'. In the particular illustration the line voltage supply is connected to the terminals 147 and 148, and the latter terminal is connected by the lead 149 to the contact arms 141 and 142 of the switch 140, while the former is connected by the lead 150 to one side of the power supply 101, the relay 120 and the high voltage supply 111. The contact 141 which is the first contact to receive energy as the screw 143 is rotated clockwise to close the circuits, is connected by means of leads 151 and 135 to energize the low voltage supply 101 and the relay 120. The contact 142' is connected by the lead 152 to the other side of the high voltage power supply. The power supplies 101 and 111 are also provided with pilot lights 101' and 111' to visibly indicate when each supply is energized.

In the operation of this switch, therefore, as the screw 143 is rotated in a clockwise direction, contact arm 141 contacts the contact 141' to energize the relay 120 and the low voltage supply 101. The operator may then permit the apparatus to remain in this condition until he is sure that the vacuum tubes in the supply 101 and in the television equipment 100 have heated and proper voltages are being supplied to the tube 110. The high voltage supply is then energized by continued rotation of the screw in the same direction until the pilot light 111' lights and the set is then ready to operate. To turn the set off, the screw is merely rotated in a counterclockwise direction until both pilot lights 101' and 111' go out.

With this novel and improved arrangement the television equipment is protected against faulty or improper operating procedure as a delay will always be provided between the energizing of the television equipment and the high voltage power supply because of the time required for the normal manual rotation of the screw.

Television equipment and particularly projection type equipment must be provided with means for controlling the brightness of the image in accordance with picture size, character of the image being reproduced, etc. Although image brightness can be controlled in a variety of ways, I have found that it is possible to obtain longer life from image reproducing tube and other parts of the equipment and also improved operation if means are provided for varying the accelerating potential. To realize these advantages it is preferable that the capabilities of the high voltage supply exceed normal operating requirements so that as the efficiency of the reproducing tubes or other elements such as the high voltage supply tubes, falls off, the high voltage control can be increased beyond a normal operating point to obtain maximum screen brilliance.

With a system of this type, however, it is possible that in adjusting the screen brilliance, the accelerating voltage may be momentarily raised beyond the breakdown value of the tube by a momentary surge in the line voltage supply or by adjustment too close to the maximum value capable of being handled by the tube in order to get maximum tube brilliance. When this occurs the high voltage jumps from a high potential part of the tube to a low potential element and is discharged to ground through one or more of the receiver and low voltage power supply elements with the result that the picture or image will be blanked out and serious damage to the equipment incurred.

In order to further improve the operation of television equipment by operation at the maximum accelerating potentials and to reduce the time during which the image is blanked out and avoid damage to the receiving equipment if the voltage increases to a value beyond the maximum rated value for the tube, I have provided means for quickly quenching or dissipating the electrical discharges produced when the tube breaks down or arcs over. I have illustrated one embodiment of this feature of the invention in the drawing wherein I employ two spark gaps 160 and 161 connected between certain elements of the tube 110 and ground.

In this embodiment the spark gap 160 is connected between the biasing or controlling element of the tube 110 and ground with the resistors 122 and 123 providing a relatively high impedance to the surges so that they will break down the gap and be discharged directly to ground. The second gap 161 associated with the tube cathode is connected between the lead 116 and ground with the resistor 115 providing a high impedance path to the surges so that the gap will break down and bypass the surge directly to ground. It is apparent that any number of such gaps can be used to protect the circuits associated with the tube and that this novel and improved circuit would also be useful in other similar applications wherein high accelerating voltages are used.

With my invention I am able to obtain improved operation, produce brighter images from television apparatus by operating the reproducing tubes relatively close to the breakdown point of the insulation between the several elements within the tube and at the same time materially reduce the possibility of damage to the equipment when using these high voltages by insuring proper operation by the user and by preventing or quickly arresting damaging conditions that may occur. Moreover, I am able to materially reduce the time of image interruption caused by these damaging conditions so that their occurrence is barely noticeable.

I claim:

1. A circuit for an electron beam tube having at least one control grid therein comprising power supply means for generating a plurality of voltages for the tube including a biasing voltage for application to the grid to limit the beam current, a relay and a condenser interconnected with said biasing voltage circuit and with the power supply means, said relay in the energized position operating to complete the bias circuit to the tube and the condenser circuit to the bias supply voltage to charge the latter and in the deenergized position disconnecting the tube and condenser from the bias supply and connecting the condenser to the tube to provide continued bias whereby excessive beam currents caused by short interruptions in the operation of the power supply will be prevented.

2. A circuit for image reproducing tubes having at least one grid therein including means for normally supplying bias to said grid, comprising an auxiliary bias supply for the tube and normally disconnected from the grid thereof and means responsive to an interruption of the normal bias supply to connect the auxiliary bias supply to the grid of the image tube.

3. In an electronic circuit for image reproducing tubes having an accelerating anode and at least one grid having high voltage generating means for producing the accelerating potential for the anode and low voltage generating means for biasing the grid, means for maintaining bias on the grid upon failure of the low voltage generating means comprising capacitive means charged by the bias voltage and disconnected from the tube grid during normal operation of the circuit, and means operative to connect said capacitive means to the tube grid for discharge therefrom upon failure of the bias voltage generator.

4. A television receiver having an image reproducing tube including an anode and at least one grid and individually energized high voltage and low voltage power supply means, said low voltage supply providing operating voltages for the receiver and tube including a biasing voltage for the grid and a high voltage for the anode, means for obtaining improved operation of said circuit comprising individual switch means for said power supplies, manually operated screw-threaded means in operative relation with said switches, said screw-threaded means being rotatable in one direction to close the low voltage switch and then the high voltage switch in spaced time relation, means associated with each power supply to indicate energization and deenergization of each supply, relay means energized by the closure of the low voltage supply switch to complete the grid biasing circuit to the receiver and low voltage supply, and a condenser associated with said relay and connected across said bias voltage supply when the relay is energized, said relay when in the deenergized condition opening the tube biasing circuit and connnecting the condenser to the tube side of said opened bias circuit.

5. In a television circuit, means for energizing the high and low voltage power supplies for the low voltage cathode and grids and the high voltage anode of an image reproducing tube, comprising an individual switch for each supply, said switches being mounted to form a unitary assembly, manually operable screw means mounted in operative relation with said switches, and means cooperating with the screw and the switches whereby rotation of the screw in one direction will first close the low voltage supply switch and continued rotation in the same direction will close the high voltage supply switch, and means including a resistor in series with at least one of the low voltage supply leads to the image reproducing tube, and a spark gap between the tube side of said resistor and ground.

6. In a television receiver, means for obtaining improved operation and image reproduction comprising means for providing auxiliary bias for one of the grids of the image reproducing tube comprising a capacitor charged by the bias voltage during the normal operation of the receiver and discharged through the biasing element in the image reproducing tube upon interruption of the normal bias voltage to prevent the establishment of excessively high electron beam currents, and means associated with said tube including a resistor in series with at least one of the grid or cathode circuits of the tube, and spark gap means between the tube side of said resistor and ground to quickly bypass discharges through the tube to ground and enable the use of accelerating voltages near the maximum tube breakdown value for brighter image reproduction.

JOHN M. CAGE.

References Cited in the file of this patent

UNITED STATES PATENTS

| Number | Name | Date |
|---|---|---|
| 1,981,537 | Allibone | Nov. 20, 1934 |
| 2,098,384 | Goodrich | Nov. 9, 1937 |
| 2,202,171 | Stocker | May 28, 1940 |
| 2,248,815 | Deserno | July 4, 1941 |
| 2,261,776 | Poch | Nov. 4, 1941 |
| 2,281,572 | Gage | May 5, 1942 |
| 2,283,727 | Gage | May 19, 1942 |
| 2,283,729 | Gage | May 19, 1942 |
| 2,355,191 | Vance | Aug. 8, 1944 |
| 2,369,631 | Zanarini | Feb. 13, 1945 |
| 2,465,406 | Taylor | Mar. 29, 1949 |
| 2,476,167 | Wendt | July 12, 1949 |

FOREIGN PATENTS

| Number | Country | Date |
|---|---|---|
| 856,126 | France | Mar. 4, 1940 |